Aug. 2, 1960  F. KOVALCIK  2,947,321
TRAP FOR CATCH BASINS
Filed April 16, 1956
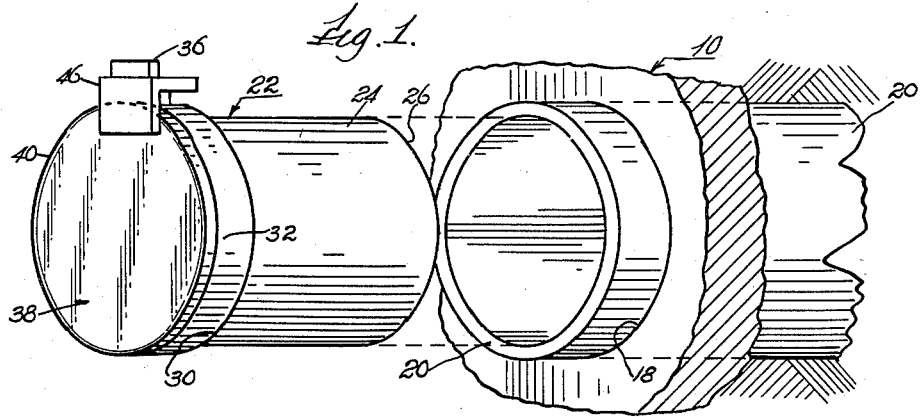
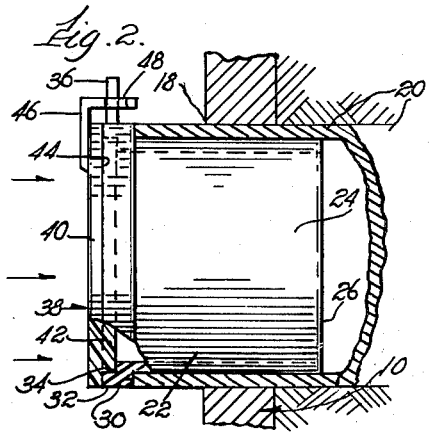
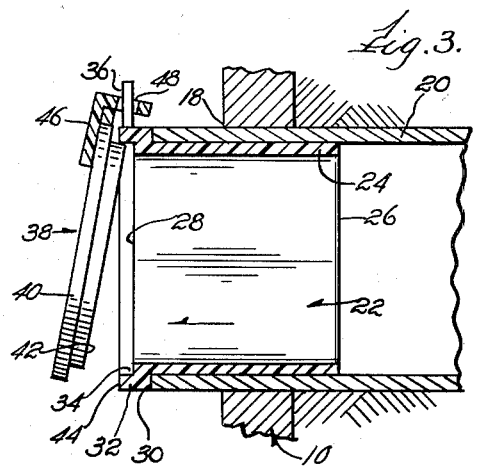
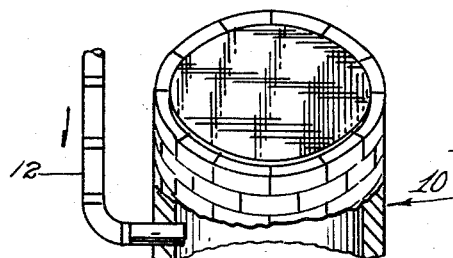
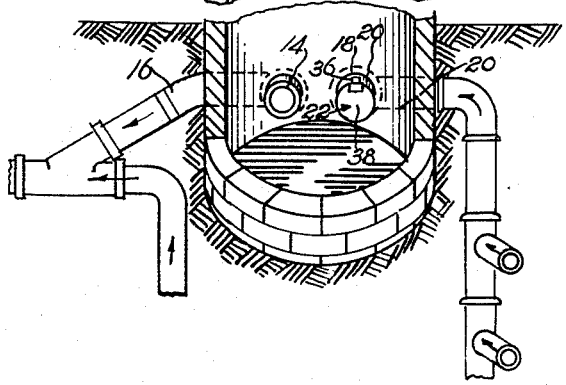
INVENTOR.
Frank Kovalcik,
BY
Attorney.

United States Patent Office

2,947,321
Patented Aug. 2, 1960

2,947,321

TRAP FOR CATCH BASINS

Frank Kovalcik, 5235 S. Seeley Ave., Chicago, Ill.

Filed Apr. 16, 1956, Ser. No. 578,332

1 Claim. (Cl. 137—516.25)

This invention relates to a trap for a catch basin.

One of the objects is to provide a new and improved trap for a catch basin that will permit the water to enter the catch basin but will prevent a backflow of the water or gases from the catch basin.

Another object of this invention is to provide a very simple and inexpensive trap which may be readily installed on any catch basin by an inexperienced person thus avoiding the use of a plumber or trained personnel.

Another object of this invention is to provide a trap which may be installed in a catch basin by merely inserting the trap into the pipe leading into the drain trap and cementing or otherwise bonding the trap in said pipe.

Other objects will become apparent as this description progresses.

In the drawings:

Fig. 1 is a perspective view of the trap prior to insertion into the waste pipe of the catch basin and looking at same from the inside of the catch basin.

Fig. 2 is a view partly in cross section showing the trap secured in the waste pipe of the catch basin and showing the trap lid in closed position.

Fig. 3 is a view similar to Fig. 2 with the trap lid open.

Fig. 4 is a view partly in cross section showing a catch basin and the trap secured therein.

The catch basin generally indicated by the numeral 10 is provided with the usual inlet pipe 12 connected to the roof rain spout for emptying water into the catch basin. The portion of the catch basin below the ground surface is provided with an outlet 14 connected through pipe 16 leading to a sewer through which the water from the catch basin discharges.

The catch basin below the ground surface is provided with an inlet opening 18 into which extends a waste pipe 20 for the purpose of discharging into the catch basin water from the wash basins, kitchen waste, basement floor drains, etc. This water drains into the catch basin; however, unless means are provided in said pipe 20, the water in the catch basin when above the level of the pipe will backflow into said pipe. This invention provides a unit which may be readily inserted and secured in the end of said pipe leading into the catch basin which permits the water in pipe 20 to empty into the catch basin but will prevent any water in the catch basin from back flowing into said pipe.

For this purpose I have provided a trap generally indicated by the numeral 22 which comprises a tubular body member 24 open at its opposite ends as at 26 and 28. The front end of the tubular body member is provided with a circumferential shoulder 30 and a forwardly extending annular lip 32 which defines an inner circumferential shoulder 34 adjacent the mouth of the tubular body.

Secured to the top of the annular lip 32 and extending upwardly thereof is a rectangular shaped bracket 36 which pivotally supports a door or lid, generally indicated at 38. The lip 38 comprises an outer annular disc 40 and an inner annular disc 42 secured to or formed integrally with the outer disc. The inner disc 42 has the same circumference as the inner circumference of the lip 32 and is adapted to fit in the lip and engage the shoulder 34 as best shown in Fig. 2 when the lid is closed. The outer disc 40 has a larger circumference and abuts against the front edge 44 of the lip 32 to completely cover same when the lid is in closed position as shown in Fig. 2. The outer disc 40 has secured thereto at the top thereof an inverted L-shaped keeper 46 which has a rectangular shaped slot 48 which engages the bracket 36 so that the lid is pivotally or swingably mounted with respect to the tubular body.

The entire unit of this invention is made preferably of a plastic material and same may be readily inserted into the end of the pipe 20 leading into the catch basin. It will be noted that the end of pipe 20 extends partially into the catch basin. The trap is merely slipped into the pipe 20 so that the shoulder 30 of the unit engages the end of the pipe. The unit is permanently bonded to said pipe by cement or the like. The pivotal lid 38 is positioned inside the catch basin. It will be understood that in the instances where the conduit to the catch basin does not extend into the catch basin as shown in Fig. 1, but is flush with the inside wall of the catch basin that the trap body 24 will be inserted into the opening in the wall of the catch basin so that the shoulder 30 of the tubular body is positioned adjacent the inner wall of the catch basin. This will still permit pivoting of the lid 38.

Water flowing through the pipe 20 into the catch basin pivots the lid 38 as shown in Fig. 3 to permit the water to enter the catch basin, however the water in the catch basin cannot backflow through said pipe as the pivotal lid will be closed as shown in Fig. 2.

There is thus provided a unit which is very simple and inexpensive and which may be readily installed without requiring the services of a plumber or a trained person.

It will be understood that various changes may be made from the foregoing without departing from the spirit and scope of the appended claim.

I claim:

A trap for a catch basin comprising a tubular valve body having a smooth outer surface of uniform dimension throughout the length of said outer surface, said valve body being open at its opposite ends, said valve body having an outer circumferential shoulder adjacent one end, said tubular valve body having an inner circumferential shoulder forwardly of said outer circumferential shoulder, an upwardly extending body extension on the top of said valve body between the outer circumferential shoulder and said adjacent one end of the valve body, a trap door having a slotted member which receives said upwardly extending extension so as to provide a pivot means for said trap door, said trap door having an outer and an inner disc and when in closed position having the inner disc positioned within said tubular body and in abutting relation with said inner circumferential shoulder and with the outer disc in abutting relation with the front of said tubular body.

References Cited in the file of this patent

UNITED STATES PATENTS

| Number | Name | Date |
|---|---|---|
| 274,204 | Lawson | Mar. 20, 1883 |
| 360,128 | Weeden | Mar. 29, 1887 |
| 390,761 | Eareckson | Oct. 9, 1888 |
| 468,141 | Tomlinson | Feb. 2, 1892 |
| 629,449 | Locke | July 25, 1899 |
| 711,457 | Armstrong | Oct. 21, 1902 |
| 814,788 | Lenhart | Mar. 13, 1906 |
| 992,954 | Gamon | May 23, 1911 |
| 1,119,909 | Walling | Dec. 8, 1914 |
| 1,152,611 | Deisbeck | Sept. 7, 1915 |
| 1,233,391 | Mullane | July 17, 1917 |
| 1,312,711 | Vert | Aug. 12, 1919 |
| 1,510,033 | Bold | Sept. 30, 1924 |
| 1,837,658 | Force | Dec. 22, 1931 |
| 2,661,019 | Snyder et al. | Dec. 1, 1953 |